Jan. 15, 1929.
H. T. SEELEY
1,699,122
CONTROL SYSTEM
Filed Jan. 31, 1927
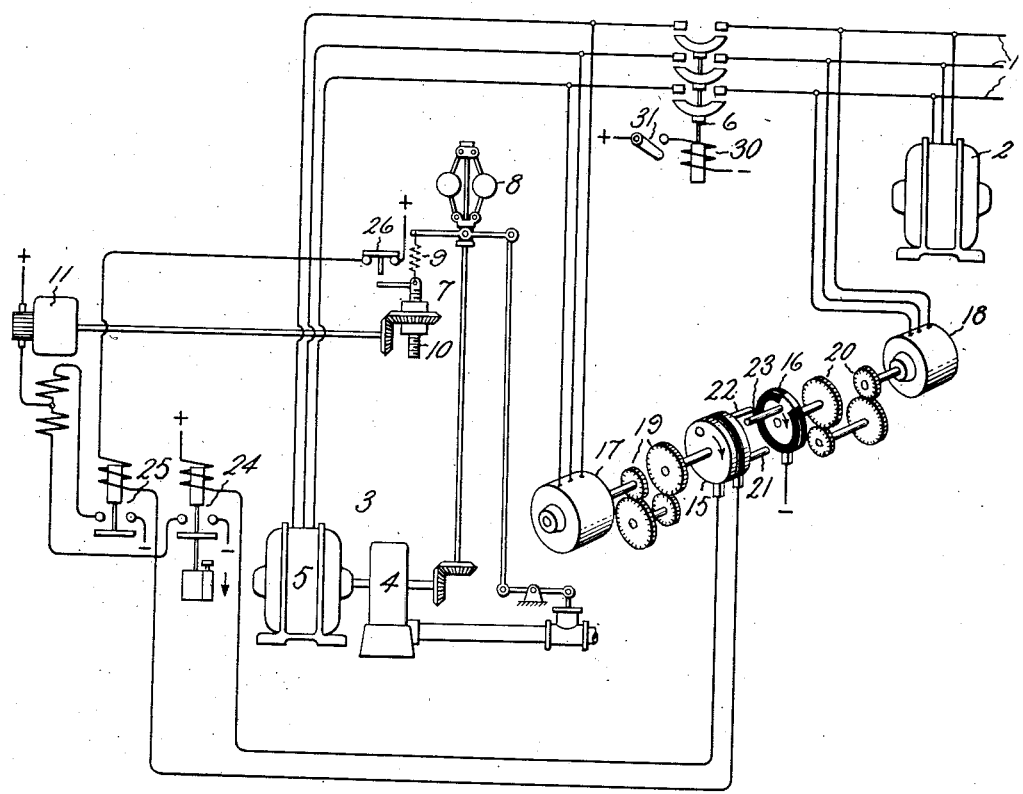
Inventor:
Harold T. Seeley.
by
His Attorney Patented Jan. 15, 1929.

1,699,122

UNITED STATES PATENT OFFICE.

HAROLD T. SEELEY, OF PHILADELPHIA, PENNSYLVANIA, ASSIGNOR TO GENERAL ELECTRIC COMPANY, A CORPORATION OF NEW YORK.

CONTROL SYSTEM.

Application filed January 31, 1927. Serial No. 164,688.

My invention relates to control systems, and particularly to control systems for controlling the supply of energy to a prime mover driving an alternating current dynamo-electric machine.

In alternating current systems in which an alternator is arranged to be synchronized with an alternating current system to which it is to be connected, it is the usual practice to control the supply of energy to the prime mover in such a manner that prior to the connection of the alternator to the system, the alternator is driven at substantially synchronous speed so that it passes slowly through synchronism and, therefore, can be readily synchronized with the system. After the alternator is connected to the system, the supply of energy to the prime mover is then increased so that the generator supplies its share of the load.

One object of my invention is to provide an improved arrangement for automatically regulating the supply of energy to the driving means for a generator so that the generator is driven at such a speed that it can be safely and readily connected to an electric circuit and so that the generator takes on its share of the load after it is connected to the electric circuit.

An other object of my invention is to provide an improved arrangement for automatically regulating the supply of energy to a prime mover which drives an alternator, so that with the alternator disconnected from the system to which it is to supply current, the alternator runs at such a speed that it passes so slowly through synchronism that the closing of the circuit breaker between the alternator and the system may be effected at the proper time, either manually or automatically, and so that the supply of energy to the prime mover is automatically increased to a predetermined amount after the circuit breaker is closed.

My invention will be better understood from the following description, taken in connection with the accompanying drawing the single figure of which diagrammatically shows a system embodying my invention, and its scope will be pointed out in the appended claims.

Referring to the accompanying drawing, 1 represents an alternating current system which is supplied by a suitable source diagrammatically indicated at 2. 3 is a dynamo electric plant comprising a motor means shown as a prime mover 4 of any suitable type driving a generator shown as an alternator 5 which is adapted to be connected to the system 1 by means of a circuit breaker 6. It will be obvious, however, that any other suitable driving means may be employed for driving the generator.

The supply of energy to the prime mover 4 may be controlled by any suitable governing means, examples of which are well known in the art. As shown in the drawing, the governor mechanism 7 comprises the well known fly ball governor 8, which works against the tension of a spring 9. In order to vary the setting of the governor mechanism 7, means are provided for adjusting the tension of the spring 9. As shown, this means comprises a screw mechanism 10 which is operated by a reversible synchronizing motor 11.

For controlling the setting of the governor mechanism 7 so that the alternator 5, when the circuit breaker 6 is open, passes slowly through synchronism and so that the alternator automatically takes on its share of the load when the circuit breaker 6 is closed, I provide two rotatable elements 15 and 16 which are arranged to be driven respectively at speeds proportional to the frequency of the alternator 5 and the system 1. The arrangement is such, however, that the elements 15 and 16 are driven at the same speed by their respective driving means only when the frequency of the alternator 5 is slightly greater than the frequency of the system. When the frequency of the alternator is the same or less than the frequency of the system, the arrangement is such that it tends to change the setting of the governor so as to increase the supply of energy to the prime mover.

Any suitable means may be provided for respectively driving the elements 15 and 16 at speeds proportional to the frequencies of the alternator 5 and the system 1. As shown, the element 15 is driven by a synchronous motor 17 electrically connected to the alternator 5 and the element 16 is driven by a synchronous motor 18 electrically connected to the system 1. Suitable gearing 19 is provided between the motor 17 and the element 15 and suitable gearing 20 is provided between the motor 18 and the element 16 so that the two elements 15 and 16 are driven at the same speed by the motors 17 and 18 respectively only when the frequency of the alternator 5 exceeds the frequency of the system 1 a predetermined amount.

The rotatable element 15 is provided with two spaced contacts 21 and 22 which are adapted to be engaged by a contact 23 on the rotatable element 16. These contacts are arranged in any suitable manner, examples of which are well known in the art, so that when element 15 is driven at a faster speed than the element 16, one of the contacts on the element 15 is moved into engagement with the contacts 23 on the element 16 and when the element 15 is driven at a slower speed, the other contact on the element 15 is moved into engagement with contact 23. Contacts 22 and 23, when in engagement, complete a circuit through a control relay 24, which in turn completes a circuit for the synchronizing motor 11 so that it rotates in one direction, and contacts 21 and 23, when in engagement, complete a circuit through a control relay 25, which in turn completes a circuit for the synchronizing motor 11 so that it rotates in the opposite direction.

For the purpose of this description, it will be assumed that the direction of rotation of the elements 15 and 16 is such that the contacts 22 and 23 are brought into engagement when the speed of the element 15 exceeds the speed of the element 16. Therefore, relay 24, when energized, causes the synchronizing motor 11 to rotate in a direction to effect a decrease in the amount of energy supplied to the prime mover 4, and the relay 25, when energized, causes the motor 11 to rotate in a direction to effect an increase in the amount of energy supplied to the prime mover 4. In order to render the control arrangement inoperative to increase the amount of energy supplied to the prime mover 4 above a predetermined amount, a limit switch 26 is provided in the circuit of the control relay 25 and is arranged to be opened by the screw mechanism 10 when the governor has a predetermined setting.

In order to prevent hunting, it is preferable to complete the circuits through the control relays 24 and 25 intermittently. This result may be accomplished in any suitable manner, examples of which are well known in the art. In the arrangement shown in the drawing, this result is obtained by arranging the collector ring through which current is led to the contact 23 so that the circuit through the contact 23 is completed only during a predetermined portion of each revolution of the element 16.

Suitable means are provided which may be controlled either manually or automatically in response to predetermined electrical conditions of the alternator 5 and the system 1 for effecting the closing of the circuit breaker 6 at the desired time.

My invention is not limited to any particular arrangement for effecting the closing of the circuit breaker 6, but is particularly adapted for use in systems in which the closing of the circuit breaker is effected by an automatic synchronizer. However, in order to simplify the disclosure shown, the circuit breaker 6 has been provided with a closing coil 30, the circuit of which is arranged to be closed by a manually operated switch 31.

The operation of the arrangement shown in the drawing is as follows: With the prime mover plant 3 in operation and the circuit breaker 6 open, the contacts 21 and 23 are in engagement and the control relay 25 is intermittently energized to change the setting of the governor mechanism 7 so as to increase the supply of energy to the prime mover 4 and thereby increase its speed until the frequency of the generator 5 exceeds the frequency of the system 1 more than a predetermined amount. When the frequency of the generator 5 does exceed the frequency of the system 1 by more than said predetermined amount, the element 15 is driven at a faster speed by the motor 17 than the element 16 is driven by the motor 18, so that contact 21 is moved out of engagement with contact 23 and contact 22 is moved into engagement with contact 23, whereby the control relay 24 is intermittently energized to change the setting of the governor mechanism 7 in such a manner as to decrease the supply energy of the prime mover 4 and thereby decrease its speed. Therefore, it will be observed that, since the elements 15 and 16 are arranged to be driven at the same speed by their respective motors only when the frequency of the alternator 5 exceeds the frequency of system 1 by a predetermined amount, the amount of energy supplied to the prime mover 4 when the alternator 5 is below synchronism is gradually increased so that the speed of the alternator 5 is increased until it reaches a value slightly above synchronous speed. If the speed of the alternator 5 exceeds its synchronous speed by more than a predetermined amount, the contacts 22 and 23 are moved into engagement with each other so that the amount of energy supplied to the prime mover 4 is decreased to cause the speed of the alternator 4 to decrease toward synchronous speed. The inherent speed variation of the prime mover 4 ordinarily will be sufficient to cause the speed of the alternator 5 to approach sufficiently near synchronous speed so that the voltages of the alternator and the system pass slowly enough through their in-phase condition to permit safe synchronizing. In some cases in practice, however, it may be desirable to provide other suitable means for so controlling the circuit of the synchronizing motor that it will be energized for a sufficient time when the contacts 21 and 23 are moved into engagement to cause the speed of the alternator to decrease to a value either more nearly equal to synchronous speed or below synchronous speed. This result may be accomplished by designing the control relay 24 so that it maintains its contacts closed for a longer time after it becomes deenergized than the relay 25 does, or by designing the motor 11 so that it rotates faster when it rotates in a direction to decrease the supply of energy to the prime mover than it does when it rotates in a direction to increase the supply of energy.

Therefore, it will be observed that with the circuit breaker 6 open, the setting of the governor mechanism 7 is controlled in such a manner that the alternator 5 passes slowly through synchronism so that the circuit breaker 6 can be closed at the proper time.

After the circuit breaker 6 is closed the frequencies of the generator 5 and the system are the same, so that the motor 17 drives the element 15 at a slower speed than the motor 18 drives the element 16. Consequently, the contacts 21 and 23 are in engagement with each other and the control relay 25 is intermittently energized to cause the motor 11 to change the setting of the governor in such a manner as to increase the supply of energy to the prime mover 4 until the governor mechanism has a predetermined setting when the limit switch 26 is opened to interrupt the circuit of the control relay 25. Therefore, when the circuit breaker is closed, the arrangement operates automatically to readjust the setting of the governor automatically to a predetermined value, so that the generator 5 is caused to supply a certain amount of the total load on system 1.

While I have, in accordance with the patent statutes, shown and described my invention as embodying various devices diagrammatically indicated, changes and modifications will be obvious to those skilled in the art, and I, therefore, aim in the appended claims to cover all such changes and modifications as fall within the true spirit and scope of my invention.

What I claim as new and desire to secure by Letters Patent of the United States is:

1. In combination, a generator, a load circuit, a switch for connecting the generator to the load circuit, motor means for driving said generator, and means responsive to the relation between corresponding electrical conditions of said generator and said load circuit for controlling the operation of said motor means to increase the speed of said generator when said electrical conditions of the generator and load circuit are substantially the same whereby said generator will take on load when said switch is closed.

2. In combination, an electric circuit, a generator adapted to be connected to said circuit, driving means for said generator and an automatic speed and load controlling arrangement for said driving means comprising means responsive to the relation between corresponding electrical conditions of said generator and said circuit for regulating said driving means so that said electrical conditions of said generator and said circuit are maintained substantially equal when said generator is disconnected from said circuit whereby said generator may be readily connected to said circuit and so that the supply of energy to said driving means is automatically increased to a predetermined value when said generator is connected to said circuit.

3. In combination, an electric circuit, a generator adapted to be connected to said circuit, driving means for said generator, and an automatic load controlling arrangement for the said driving means comprising means responsive to the relation between corresponding electrical conditions of said generator and circuit arranged to effect an increase in the supply of energy to said driving means when said electrical condition of said generator is equal to and less than that of the electric circuit.

4. In combination, a generator, a load circuit, a switch adapted to be operated to connect the generator to the load circuit, means for driving said generator, means responsive to the speed of said generator for controlling the power of said driving means, and means responsive to predetermined electrical conditions of said generator and load circuit for controlling said speed responsive means arranged to affect the power of said generator driving means to maintain the electrical condition of the generator substantially equal to that of the load circuit while the switch is open and to increase the power of said driving means when said predetermined electrical conditions are equal whereby upon closing said switch the power of said driving means will be increased to cause the generator to take on load.

5. In combination, an alternating current system, an alternator adapted to be connected thereto, a prime mover for said alternator and an automatic speed and load controlling arrangement for said prime mover comprising means responsive to the relative frequencies of said system and alternator for controlling the supply of energy to said prime mover so that with said alternator disconnected from said system said alternator passes slowly through synchronism and when said alternator is connected to said system the supply of energy to said prime mover is automatically increased to a predetermined value whereby said alternator takes on load.

6. In combination, an alternating current system, an alternator adapted to be connected to said system, driving means for said alternator and an automatic load controlling arrangement for said driving means comprising means responsive to the relative frequencies of said system and alternator for effecting an increase in the supply of energy to said driving means when the frequencies of the alternator and the system are the same.

7. In combination, an alternating current system, an alternator adapted to be connected to said system, a prime mover driving said generator and an automatic speed regulating arrangement for said prime mover comprising a plurality of elements, means for driving one of said elements at a speed proportional to the frequency of said alternator, means for driving another of said elements at a speed proportional to the frequency of said system, said elements being arranged to be driven at the same speed by their respective driving means when the frequency of said alternator exceeds the frequency of said system a predetermined amount, and means responsive to the relative speeds of said elements for controlling the supply of energy to said prime mover so that said alternator passes slowly through synchronism.

8. In combination, an alternating current system, an alternator adapted to be connected to said system, a prime mover driving said alternator and an automatic speed regulating arrangement for said prime mover comprising an element arranged to be driven at a speed proportional to the frequency of said alternator, another element arranged to be driven at a speed proportional to the frequency of said system, said elements being arranged to be driven at the same speed by their respective driving means when the frequency of said alternator exceeds the frequency of said system a predetermined amount, and means controlled by said elements for effecting an increase in the amount of energy supplied to said prime mover when the speed of said first mentioned element is less than the speed of said second mentioned element and a decrease in the amount of energy supplied to said prime mover when the speed of said first mentioned element is greater than the speed of said second mentioned element.

9. In combination, an alternating current system, an alternator adapted to be connected to said system, a prime mover driving said alternator and an automatic load controlling arrangement for said prime mover comprising an element arranged to be driven at a speed proportional to the frequency of said alternator, another element arranged to be driven at a speed proportional to the frequency of said system, said elements being arranged to be driven at the same speed by their respective driving means when the frequency of said alternator exceeds the frequency of said system a predetermined amount, and means controlled by said elements for effecting an increase in the amount of energy supplied to said prime mover to a predetermined value when the speed of said first mentioned element is less than the speed of the other element.

10. In combination, an alternating current system, an alternator adapted to be connected to said system, a prime mover for driving said alternator, a governor mechanism for said prime mover, and means for effecting a predetermined setting of said governor mechanism after said alternator is connected to said system comprising frequency responsive means arranged to change the setting of said governor mechanism so as to increase the amount of energy supplied to said prime mover when the frequencies of alternator and system are the same.

11. In combination, an alternating current system, an alternator adapted to be connected to said system, a prime mover for driving said alternator, a governor for said prime mover, a synchronizing motor adapted to control the setting of said governor, and means for controlling the operation of said motor comprising an element arranged to be driven at a speed proportional to the frequency of said alternator, another element arranged to be driven at a speed proportional to the frequency of said system, said elements being arranged to be driven at the same speed when the frequency of said alternator exceeds the frequency of said system a predetermined amount, and means controlled by said elements for completing a circuit for said motor to cause it to vary the setting of said governor so as to increase the supply of energy to said prime mover when the speed of said first mentioned element is less than the speed of the other element and for completing a circuit for said motor to cause it to vary the setting of said governor so as to decrease the supply of energy to said prime mover when the speed of said first mentioned element exceeds the speed of the other element.

12. In combination, an alternating current system, an alternator adapted to be connected to said system, a prime mover for driving said alternator, a governor for said prime mover, a synchronizing motor adapted to control the setting of said governor, and means for controlling the operation of said motor comprising an element arranged to be driven at a speed proportional to the frequency of said alternator, another element arranged to be driven at a speed proportional to the frequency of said system, said elements being arranged to be driven at the same speed when the frequency of said alternator exceeds the frequency of said system a predetermined amount, means controlled by said elements for completing a circuit for said motor to cause it to vary the setting of said governor so as to increase the supply of energy to said prime mover when the speed of said first mentioned element is less than the speed of the other element and for completing a circuit for said motor to cause it to vary the setting of said governor so as to decrease the supply of energy to said prime mover when the speed of said first mentioned element exceeds the speed of the other element, and means arranged to be operated when the governor has a predetermined setting to prevent said controlling means from changing the setting of the governor so as to increase the supply of energy to said prime mover.

In witness whereof, I have hereunto set my hand this 27th day of January, 1927.

HAROLD T. SEELEY.